D. DESHON.
NUT-LOCK.

No. 181,419. Patented Aug. 22, 1876.

WITNESSES
Thomas Bernard
Wm. H. Lister

Daniel Deshon
INVENTOR

Redson Bros
ATTORNEYS

UNITED STATES PATENT OFFICE.

DANIEL DESHON, OF BUCYRUS, OHIO, ASSIGNOR OF ONE-HALF HIS RIGHT TO AUGUSTUS SHONERT, OF SAME PLACE.

IMPROVEMENT IN NUT-LOCKS.

Specification forming part of Letters Patent No. 181,419, dated August 22, 1876; application filed June 5, 1876.

*To all whom it may concern:*

Be it known that I, DANIEL DESHON, of Bucyrus, in the county of Crawford and State of Ohio, have invented certain new and useful Improvements in Nut-Locks; and I do hereby declare that the following is a full, clear, and exact description thereof, which will enable others skilled in the art to which it appertains to make and use the same, reference being had to the accompanying drawings, and to the letters of reference marked thereon, which form a part of this specification, and in which—

Figure 1:
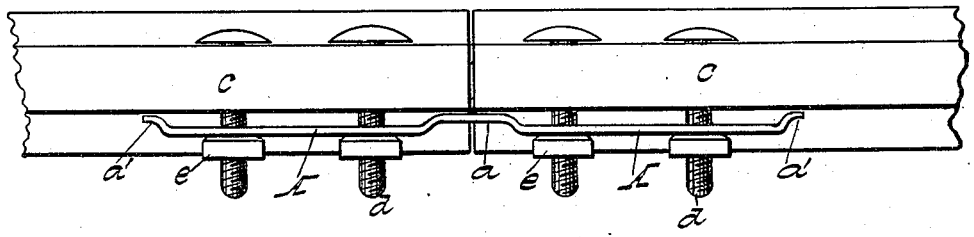
Figure 2:
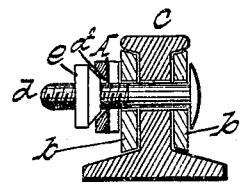
Figure 3:
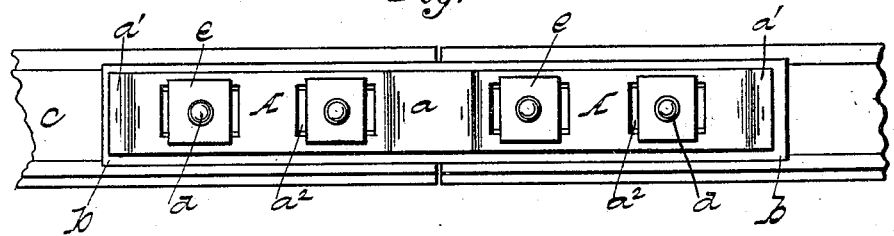

Figure 1 is a plan view of my improved nut-lock as applied for use in connection with railroad-rails; Fig. 2, a transverse section thereof, and Fig. 3 a side view of the same.

Corresponding parts in the several figures are designated by like letters.

This invention relates to a certain improvement in nut-locks; and it consists of a spring or plate, with tapering apertures or openings to receive correspondingly beveled or chamfered nuts upon bolts passing through the said spring or plate, &c., substantially as hereinafter more fully set forth.

In the annexed drawing, A refers to a plate or spring, with its inwardly curved or bowed central portion $a$ and its correspondingly-curved ends $a^1 a^1$ pressing against the fish-bar $b$, connecting the sections of railroad-rails $c\ c$ together, to illustrate one of the uses to which my nut-lock may be applied. The isolated portions of the spring or plate A are provided with apertures or openings $a^2 a^2$ for the passage of the nutted ends of the bolts $d\ d$, connecting the fish plates or bars $b\ b$ to the sections of railroad-rails $c\ c$, they, in turn, connecting the said sections together. The apertures or openings $a^2 a^2$ of the spring or plate A taper inwardly, or widen toward the nuts $e\ e$ to receive the same, correspondingly beveled or chamfered to fit therein, as clearly seen in Fig. 2.

By this construction, when the nuts are screwed up sufficiently to bring the pressure of the spring or plate A against them, the chamfered or beveled surface thereof will enter the tapering apertures and press against their beveled or chamfered sides, and be thus firmly locked thereto, and prevented from turning and leaving their bolts when subjected to concussion or jarred.

The above-described locking mechanism, in securing sections of railroad-rails together, is repeated at the conjunction of each section.

I am aware that providing the fish-bar with tapering or beveled recesses or grooves to receive correspondingly-beveled nuts is not new, nor the use of intermediate countersunk nuts or plates in connection with the fish-bar and beveled nuts fitting in said countersunk nuts or plates.

Having thus described my invention, what I claim, and desire to secure by Letters Patent, is—

The bowed plate or spring A, having tapering apertures or openings $a^2 a^2$ to receive, and in combination with, the bolts $d\ d$, beveled or chamfered nuts $e\ e$, and fish bars or plates $b\ b$, substantially as and for the purpose set forth.

In testimony that I claim the foregoing as my own I hereunto affix my signature in presence of two witnesses.

DANIEL DESHON.

Witnesses:
SAMUEL BONEBRAKE,
WM. STREMMEL.